(12) United States Patent
Bezancon (10) Patent No.: US 7,942,319 B2
(45) Date of Patent: May 17, 2011

(54) LOCATION INFORMATION MANAGEMENT

(75) Inventor: Anne Bezancon, Oakland, CA (US)

(73) Assignee: 1020, Inc., San Francisco, CA (US)

( * ) Notice: Subject to any disclaimer, the term of this patent is extended or adjusted under 35 U.S.C. 154(b) by 971 days.

(21) Appl. No.: 11/743,102

(22) Filed: May 1, 2007

(65) Prior Publication Data

US 2007/0260531 A1 Nov. 8, 2007

Related U.S. Application Data

(60) Provisional application No. 60/746,209, filed on May 2, 2006, provisional application No. 60/746,216, filed on May 2, 2006.

(51) Int. Cl.
*G07B 15/02* (2011.01)
(52) U.S. Cl. ............................. 235/384; 235/385; 705/26
(58) Field of Classification Search .................. 235/384, 235/385; 705/26
See application file for complete search history.

(56) References Cited

U.S. PATENT DOCUMENTS

| | | | |
|---|---|---|---|
| 5,835,061 A | 11/1998 | Stewart | |
| 5,948,061 A | 9/1999 | Merriman et al. | |
| 5,969,678 A | 10/1999 | Stewart | |
| 5,991,739 A * | 11/1999 | Cupps et al. | 705/26 |
| 6,259,405 B1 | 7/2001 | Stewart et al. | |
| 6,326,918 B1 | 12/2001 | Stewart | |
| 6,452,498 B2 | 9/2002 | Stewart | |
| 6,553,310 B1 | 4/2003 | Lopke | |
| 6,629,136 B1 | 9/2003 | Naidoo | |
| 6,697,018 B2 | 2/2004 | Stewart | |
| 6,759,960 B2 | 7/2004 | Stewart | |
| 6,795,700 B2 | 9/2004 | Karaoguz et al. | |
| 6,798,358 B2 | 9/2004 | Joyce et al. | |
| 6,799,032 B2 | 9/2004 | McDonnell et al. | |
| 6,819,267 B1 | 11/2004 | Edmark et al. | |
| 6,832,373 B2 | 12/2004 | O'Neill | |
| 6,845,400 B2 | 1/2005 | Mapherson et al. | |
| 6,848,542 B2 | 2/2005 | Gailey et al. | |
| 6,983,313 B1 | 1/2006 | Korkea-aho | |
| 7,009,556 B2 | 3/2006 | Stewart | |
| 2001/0054009 A1 | 12/2001 | Miller et al. | |
| 2002/0082931 A1 | 6/2002 | Siegel et al. | |
| 2003/0135581 A1 | 7/2003 | Phalen et al. | |
| 2004/0209602 A1 | 10/2004 | Joyce et al. | |

(Continued)

FOREIGN PATENT DOCUMENTS

WO 2007131003 A2 11/2007

(Continued)

OTHER PUBLICATIONS

PCT Notification of Transmittal of the International Search Report and the Written Opinion of the International Searching Authority, or the Declaration, in PCT Application No. PCT/US2007/067969, paper dated Feb. 12, 2008, 11 pages.

(Continued)

*Primary Examiner* — Michael G Lee
*Assistant Examiner* — Kristy A Haupt
(74) *Attorney, Agent, or Firm* — DLA Piper LLP (US)

(57) ABSTRACT

A method of managing product-location specific information is provided. Product-location specific information is collected from multiple users at a centralized network hub and transformed into location-harmonized data with one or more attached attributes including product data. The location-harmonized product-location specific data and/or content derived therefrom is distributed, and/or other content is distributed based on the location-harmonized product-location specific data and/or on the location harmonized data, to the same or different users. One or more efficient customer access methods is/are also provided.

59 Claims, 5 Drawing Sheets

U.S. PATENT DOCUMENTS

| | | | |
|---|---|---|---|
| 2004/0243307 A1* | 12/2004 | Geelen | 701/213 |
| 2005/0282556 A1 | 12/2005 | Morris | |
| 2007/0260741 A1 | 11/2007 | Bezancon | |

FOREIGN PATENT DOCUMENTS

| | | | |
|---|---|---|---|
| WO | WO 2007/131001 A2 | 11/2007 |
| WO | WO 2007/131003 A2 | 11/2007 |
| WO | WO 2007/131001 A3 | 12/2007 |

OTHER PUBLICATIONS

U.S. Appl. No. 10/886,520, filed Jul. 6, 2004, Bezancon.

Notification of Transmittal of the International Search Report and the Written Opinion of the International Searching Authority, or the Declaration, in PCT Application No. PCT/US2007/067966, paper dated Oct. 31, 2007, 9 pages.

* cited by examiner

LOCATION INFORMATION MANAGEMENT

PRIORITY

This application claims the benefit of priority under 35 USC §119 to U.S. provisional patent applications Nos. 60/746,209 and 60/746,216, each filed May 2, 2006, which are incorporated by reference.

BACKGROUND

Currently, location information as it pertains to business activity is looked upon as a consequence of said business activity (when looking at the yellow pages, search by business type first, then find the address and telephone number). If business B1 runs a restaurant a location L1, and business B2 offers wi-fi connectivity at same Location L1, the information about L1 is going to be collected and managed separately and for different purposes by B1 and B2. The "place" will be described differently, the street address expressed differently, the name of the business will be described differently (ex: McDonald's #123 vs. McDonald's Washington St vs. Mac-Donald's Restaurant)

Currently, location information is used as a semantic construction to describe where a physical place is (postal addressing standards historically derived from necessity to classify, organize and find places) but there is no generally adopted system to describe places which do not have a postal address, although any physical place on earth has a unique combination of latitude and longitude It is desired to consider a business activity as a set of attributes specific to an entity performing a business activity at a given location to enable management of location information in an advantageously new way.

Figure 1:
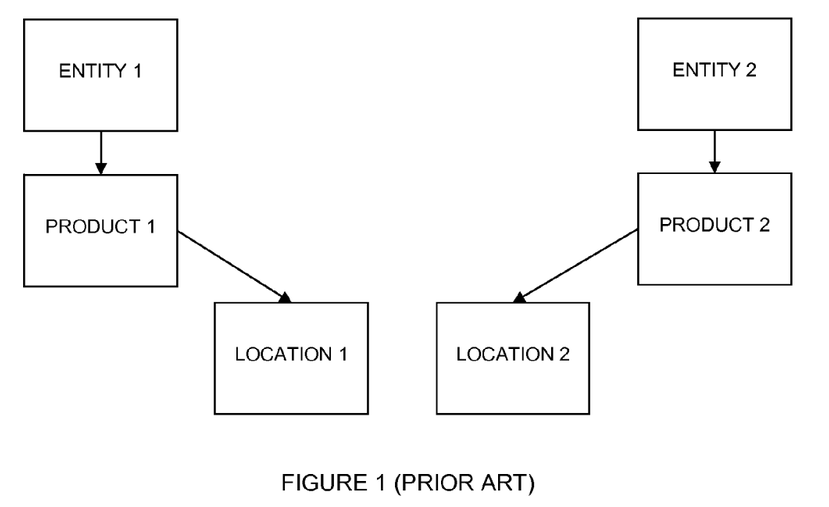
FIG. 1 schematically illustrates a conventional location specific data collection method. Even though LOCATION 1 and LOCATION 2 are the same logical location, they are not harmonized and are managed separately.

Referring to FIG. 1, which illustrates a conventional product-location specific data collection method, consider that at time 1, entity 1 creates a record of location 1 because of instance of product 1 at location 1 called product-location 1. For example, McDonald's (entity) creates a record of a new restaurant (product) at 123 Main street in Oakland, Calif. (location), resulting in: McDonald's #3487, 123 North Main St, Oakland, Calif.

Then consider that at time 2, entity 2 creates a product-location record 2 at the same location. For example Wayport (entity) creates a record of a new wi-fi hotspot (product), resulting in MACDONALDS, 123 MAIN N, OAKLAND, CA (location).

Clearly, the two locations are physically the same or at least they ought to be deemed identical for certain purposes. However, they may well be read as two different locations, e.g., location 1 and location 2, due to their different expressions of the same physical address. It is desired to have a system which puts the location object at the center of the model and system, rather than centralizing an entity or product associated with the location, or a combination of entity or product with the location.

SUMMARY OF THE INVENTION

A method is provided for managing product-location specific. Product-location specific information is collected from multiple users at a centralized network hub. The information is transformed and the location data are harmonized to generate location-harmonized data. One or more attributes are attached to the location-harmonized data at least including product data to generate location-harmonized product-location specific data. The location-harmonized product-location specific data and/or content derived therefrom is distributed, and/or other content is distributed based on the location-harmonized product-location specific data and/or on the location harmonized data, to the same or different users. One or more efficient customer access methods is/are also provided.

The location data may be harmonized by converting collected location information to latitude-longitude coordinates and/or geocoding, which may include converting collected location information to latitude-longitude coordinates and/or providing an electronic map and determining latitude-longitude coordinates of a specific location on the map indicated by a user. The location data may also be harmonized by assigning a same location identifier to at least two location data corresponding to a same geographic location.

The location-harmonized product-location specific data and/or the location-harmonized data may be translated to one or more specific customer access formats, typologies and/or languages.

The one or more attributes may include vendor and/or time data.

The method may further include determining that a location of an on-line user is within a geographic region that is sufficiently proximate to the location corresponding to an instance of the location-harmonized product-location specific data.

The location-harmonized information may be visualized for the customer by providing a geographical map identifying locations of products. The map may include an interactive component that permits a customer to retrieve product, vendor, time, and/or other attribute relating to a location identified on the map. The location may include a specific point or an area on the map.

Activity relating to the handling of the product-location specific information and/or data generated therefrom may be compiled and reported.

DETAILED DESCRIPTION OF THE EMBODIMENTS

Transforming Heterogeneous Raw Data into Standardized, Uniform, Consistent Information Data obtained from multiple sources of information that overlap but are not expressed in the same fashion cannot be organized, stored and retrieved effectively.

By managing the two records above in the same system, when Wayport enters their information, the system understand that it the same location, and Wayport is prompted with a message telling them that the location "McDonald's #3487, 123 North Main St, Oakland, Calif." is already in the system, and that they can select it as the location they are referring to. Using this method, there is no confusion as to which location it is, and the location is semantically described the same way for McDonald's and for Wayport (and avoids the typos in Wayport's way of spelling McDonald's too).

The accuracy, relevance and consistency of the location's information are increased in proportion of the number of entities relating their products and services to it.

Accuracy and precision (and their expression through latitude and longitude coordinates, or "geocode") are objective measurements of the effectiveness of a location information management system. However, accuracy does not equate relevance of the information, which is subjective and depends upon the entity and its purpose. If a location comes in as 123 Main street in Oakland, Calif., it is accurate, but it may not be relevant if their was a typo in the original input and the actual address for the location in question is 213 Main street. 1020's system, by identifying the uniqueness of a location through the combination of multiple attributes, can offer the user "candidate" locations to chose from that match some of the criteria of the entered record. In the example above, if the location name contains "McDonald's" and the address given is within ¼ mile of another address already in the repository with a name containing McDonald's, then the system will ask the user if this is the location described by the new record.

Figure 2:
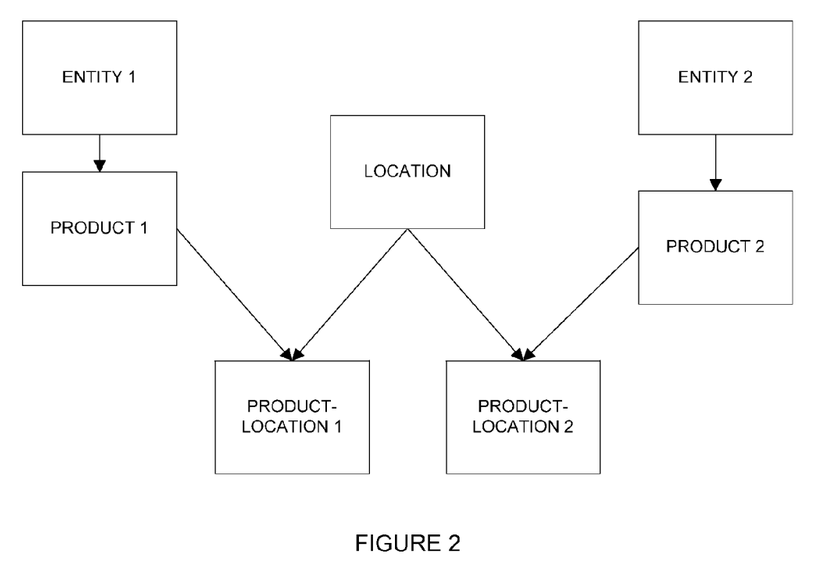
FIG. 2 schematically illustrates a product-location specific data collection method in accordance with a preferred embodiment.

FIG. 2 illustrates how entity 1 and entity 2 provide respective product-location specific information as product-location 1 and product-location 2. The products are different, but the locations are really the same. The location information is harmonized, as product 1 and product 2 are actually available at the same or similar location. The locations could be broader, such as a certain neighborhood in Oakland, or Oakland, Calif. itself, or just California, or Alameda County.

Figure 5:
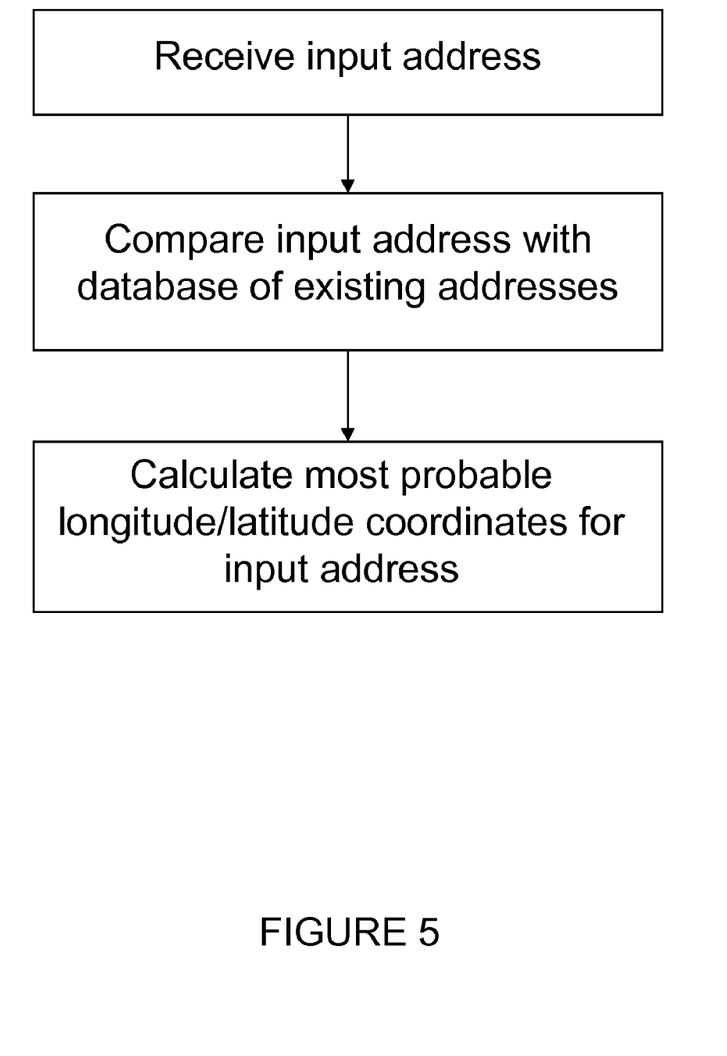
FIG. 5 is a flow diagram illustrating an implementation of geocoding.

Providing Multiple Methods to Collect Precise Geographical Coordinates for a given Location As illustrated in FIG. 5, the process of "geocoding" is currently performed by comparing an input address with a database of existing addresses (or more often street segments with building number boundaries) which have already been associated with latitude and longitude coordinates. Current geographical information system software calculates the most probable coordinates for the input location by assuming distance from the end points based on the street number given in the input, unless they can use more detailed and complete datasets that already have exact geocode information for each building on a given street. Geocode information is available in the United States, in part due to public and free datasets made available by the government, but this is not the case in other countries, where alternative methods such as the one described below can be used.

Figure 6:
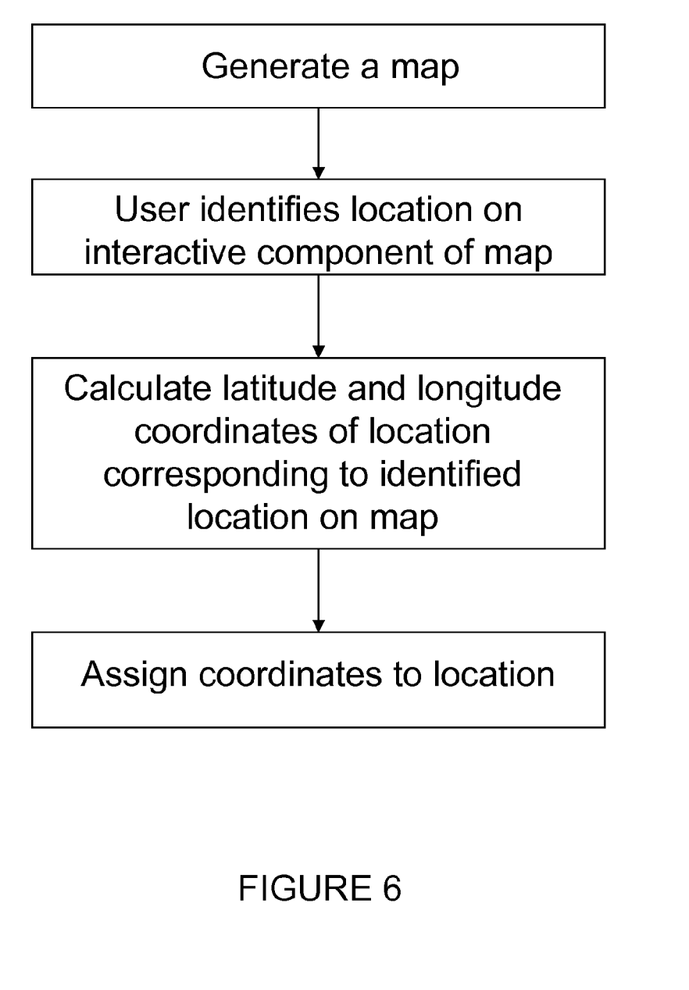
FIG. 6 is a flow diagram illustrating an implementation of an interactive electronic map.

The system will additionally allow direct interaction with an electronic map, whereby the user can click on a precise point on the map at the "place" they know corresponds to the proper position of the location they want to geocode, as illustrated in FIG. 6. The system will calculate what latitude and longitude coordinates correspond to that "click" and assign those coordinates to the location in the database.

Figure 3:
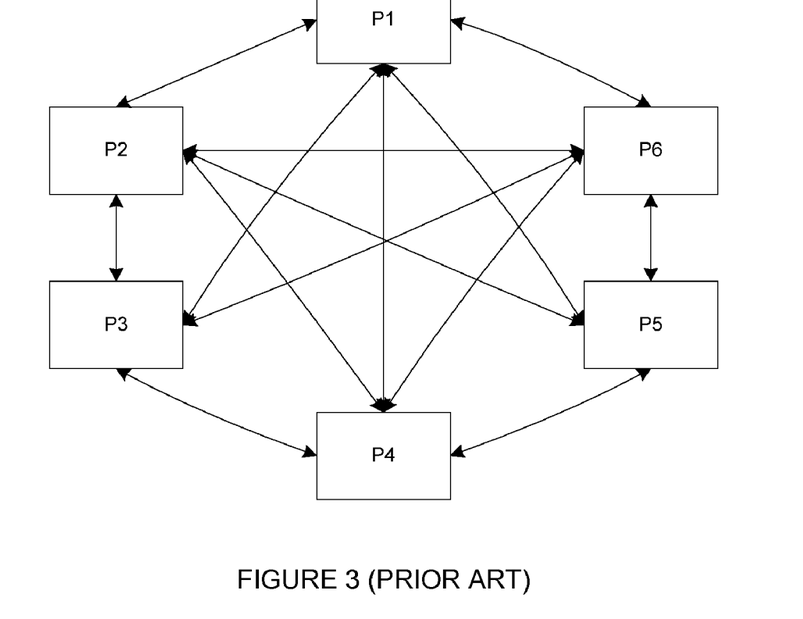
FIG. 3 schematically illustrates a conventional information sharing method among several business associates.

Improve Quality of Information and Efficiency of Communication by Replacing Multiple Bilateral Flows of Information between Business Entities with Multiple Single Flows from and to a Centralized Network Hub Referring now to FIG. 3, which schematically illustrates a conventional information sharing method among several business associates, when entity 1 creates a new record about a new location 2 in the system, information about this location 2 is immediately available for other entities to use, either to attach their own product to, or to obtain information about entity 1's business.

Entity 1 may be in business with five other entities 2, 3, 4, 5 and 6. Entity 1 provides its five partners with a list of its locations every week. Entity 1 therefore sends five lists of the same data to five different partners every week. If the four partners of entity 1 are also partners among themselves, and also send to all their partners a list of their locations every week, then we have the following location data flows.

Entity 1 > Entity 2
Entity 1 > Entity 3
Entity 1 > Entity 4
Entity 1 > Entity 5
Entity 1 > Entity 6
Entity 2 > Entity 1
Entity 2 > Entity 3
Entity 2 > Entity 4
Entity 2 > Entity 5
Entity 2 > Entity 6
Entity 3 > Entity 1
Entity 3 > Entity 2
Entity 3 > Entity 4
Entity 3 > Entity 5
Entity 3 > Entity 6
Entity 4 > Entity 1
Entity 4 > Entity 2
Entity 4 > Entity 3
Entity 4 > Entity 5
Entity 4 > Entity 6
Entity 5 > Entity 1
Entity 5 > Entity 2
Entity 5 > Entity 3
Entity 5 > Entity 4
Entity 5 > Entity 6
Entity 6 > Entity 1
Entity 6 > Entity 2
Entity 6 > Entity 3
Entity 6 > Entity 4
Entity 6 > Entity 5

Figure 4:
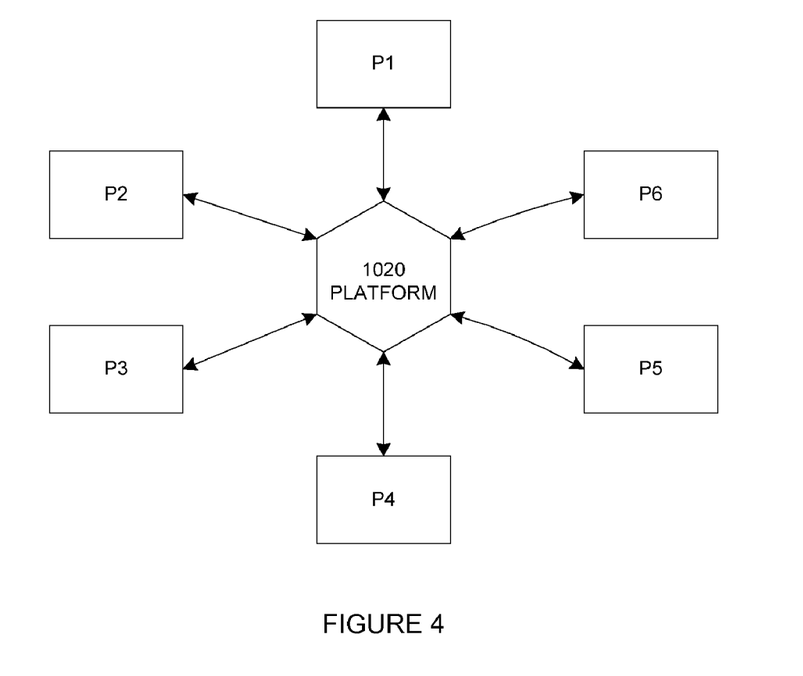
FIG. 4 schematically illustrates an information sharing method in accordance with a preferred embodiment.

These 30 distinct data flows can be reduced to 12 (6 in and 6 out), as illustrated schematically at FIG. 4. The accuracy of the location information and the timeliness of its delivery increase tremendously in a system in accordance with a preferred embodiment wherein each entity communicates with the centralized network hub or 1020 platform, which manages input and output to all relevant business associates and partners. In the case illustrated at FIG. 4, there is only one input and one output from each entity to and from the centralized hub.

Each entity P1 to P6 publishes to each of its partners, and subscribes to each of them as well, through the hub or 1020 exchange platform.

An added benefit is that as each customer P1 to P6 integrates with the platform running on the centralized hub, a new customer can "hook into" the network of existing customers at a fraction of the original cost.

Building Interfaces at the Edge of the System

Figure 7:
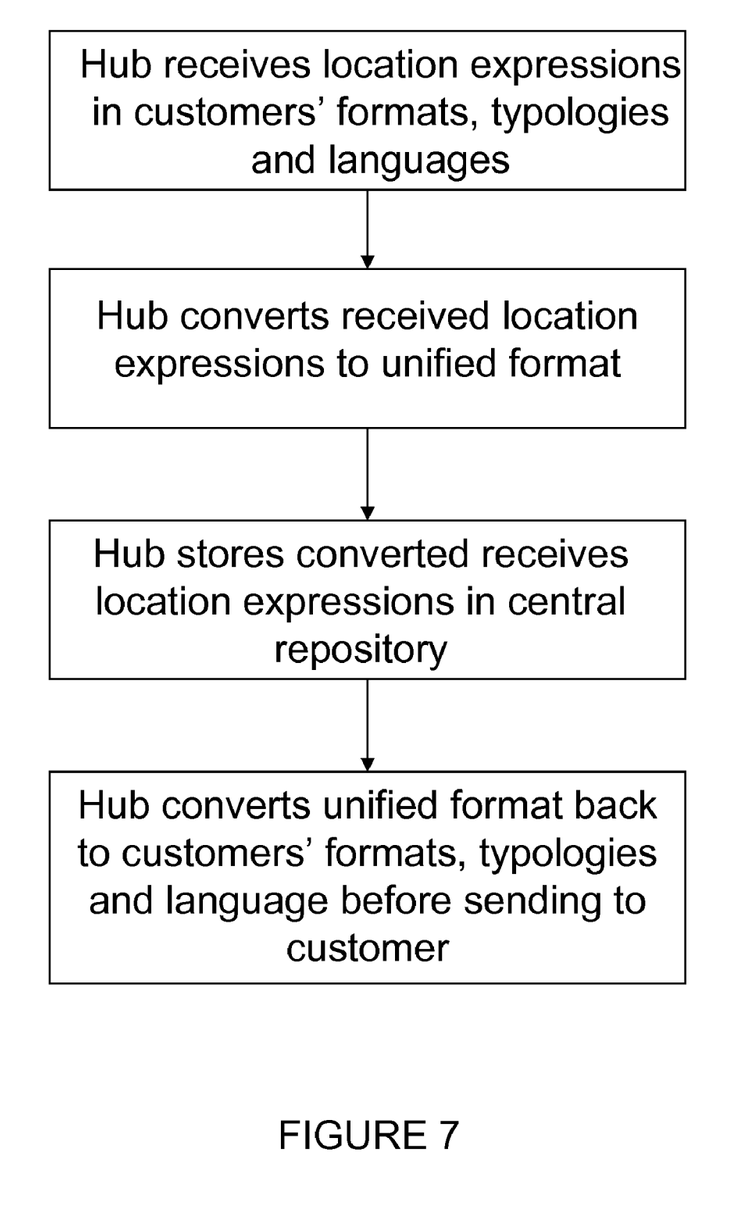
FIG. 7 is a flow diagram illustrating hub interfacing steps for which customer expressions of location are converted into a unified format, and are optionally converted back to the customer expressions when obtained by the customer.

The hub serves as a data interface. Entities express their location and product location information in the format, typology and language that suits their business. The hub adapts to the existing raw data coming in whatever format, type and language (vocabulary, spelling, grammar, syntax) and converts it into an unified format, typology and language, as illustrated in FIG. 7. Conversely, the hub may translate back into customer language whatever data the customer obtains from the hub's central repository.

An access method interfaces may be provided for pushing and/or pulling data. Entities may wish to be sent updates from specific partners at certain times or based upon a quantity of added records. Alternately, they may wish to come get partner records from the repository. The hub configures these access methods for each customer.

Exchanging Information in Real-Time

Since each entity updates the information in the repository as frequently as their own business needs dictate, this information is constantly in the freshest possible state to be used by partners.

Using technology like web services and messaging, it is possible for a partner to receive updates to location information in real-time.

The hub's location information repository is in constant state of accuracy and freshness.

Attaching Attributes to Location

Information about the specific instance of the product at the location for a given entity is processed and stored along the location information. This "product-location specific" information is configured along product types and product classes and results in attributes that accommodate the description of the specific product associated with the location.

These attributes are specific and may be relevant to:
The location (where);
the entity (who);
the product (what);
the unique instance of that product at that location for that entity (what/how/why); and/or
time (when), or other commercially-relevant attributes as understood by those skilled in the art.

Reporting

Instances of a records input by users in the system may be recorded individually. Instances of that record failing a processing step test may be recorded as well.

This facilitates auditing of the quality of the record. Instances of records output by users from the system may also be recorded individually.

Reports may be provided to the user by volume over time period (year, month, week, day). Reports may also be provided by the nature of the transaction with the system, e.g., upload, download, and/or process error. Reports may also be provided by user type by transaction, e.g., user's own upload and download of data, partner download of user data (partner is subscriber, and user is publisher), and/or user download of partner data (partner is publisher, and user is subscriber).

Visualization

Location data in the system contains precise latitude and longitude for each location. It is therefore possible to represent all locations or any group of location based on any criteria on a geographical map. For example: show all coffee shops in San Francisco to the exclusion of coffee shops with the brand Starbucks.

The selection of criteria to display a map can be done via tabular data, as well as by interaction directly with the electronic map, for example by selecting a succession of points to trace a circle, ellipse or other curved planar surface and/or polygonal surface, or non-planar surface such as a 3D surface, or a polyhedron, and show all the locations within the boundaries of this figure, or only those meeting certain other criteria input by the user or programmed into the system.

Another feature of the system is the visualization of data changes over a time period. The user can select location data to represent on the map at an initial time, then at intervals until an ending time, in order to create the effect of animation.

Enabling Location-Based Services

Based on the ability described above to accurately collect, manage, de-duplicate, process, store and retrieve location information in relation to space and time and to attach attributes to it, we can use this information to enable all manner of location-based services.

One embodiment of a location-based service includes distributing the location-harmonized product-location specific data to on-line customers or users (or both). The data is provided in any of multiple formats and delivered using any of various technologies. In certain embodiments, data is provided in an XML format using SOAP-based web services.

Another embodiment includes a location-based content communication system in which location-specific content (that is particularly relevant at or near a certain location) is communicated and delivered to a user. The location-specific content is communicated only to one or more internet protocol-enabled (IP) devices that are accessible by wired and/or wireless access devices located at or near a certain location.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What follows is a cite list of references that are hereby incorporated by reference into the detailed description of the preferred embodiments as disclosing elements or features alternative to the preferred embodiments: U.S. Pat. Nos. 5,948,061, 6,795,700, 6,798,358, 6,799,032, 6,832,373, 6,845,400, 6,848,542, and 5,835,061, 5,969,678, 6,259,405, 6,326,918, 6,452,498, 6,697,018, 6,759,960, 7,009,556, and U.S. patent applications No. 10/886,502, 60/913,444 and 60/913,451, and www.freefinet.com, www.wifinder.com, www.jiwire.com, www.1020systems.com, and www.wi-fi-planet.com

What is claimed is:

1. A method of managing product-location specific information, comprising:
   (a) collecting product-location specific information for a single geographic location from multiple users at a centralized network hub, wherein said product-location specific information includes a plurality of different expressions for the single geographic location;
   (b) transforming said product-location specific information to generate location-harmonized data that includes a single expression for the single geographic location;
   (c) associating one or more attributes of the single geographic location to the location-harmonized data to generate location-harmonized product-location specific data; and
   (d) distributing said location-harmonized product-location specific data, or content derived therefrom to the same or different users.

2. The method of claim 1, wherein the transforming comprises converting location information of the product-location specific information to latitude-longitude coordinates.

3. The method of claim 1, wherein the transforming comprises geocoding.

4. The method of claim 3, wherein the geocoding comprises converting location information to latitude-longitude coordinates.

5. The method of claim 3, wherein the geocoding comprises providing an electronic map and determining latitude-longitude coordinates of a specific location on the map indicated by a user.

6. The method of claim 1, further comprising translating the location-harmonized product-location specific data to one or more specific customer access formats.

7. The method of claim 1, further comprising translating the location-harmonized product-location specific data to one or more specific customer access typologies or languages or both.

8. The method of claim 1, further comprising translating the location-harmonized data to one or more specific customer access formats.

9. The method of claim 1, further comprising translating the location-harmonized data to one or more specific customer access typologies or languages or both.

10. The method of claim 1, wherein the one or more attributes further comprise vendor data.

11. The method of claim 1, wherein the one or more attributes further comprise time data.

12. The method of claim 1, wherein the distributing comprises determining that a location of an on-line user is within a geographic region that is sufficiently proximate to the single geographic location.

13. The method of claim 1, further comprising visualizing the location-harmonized information for the customer by providing a geographical map identifying locations of products.

14. The method of claim 13, wherein said map comprises an interactive component that permits a customer to retrieve product, vendor, time, or other attribute, or combinations thereof, relating to a location identified on the map.

15. The method of claim 14, wherein the location comprises an area on the map.

16. The method of claim 1, further comprising reporting activity relating to the handling of the product-location specific information or data generated therefrom, or combinations thereof.

17. A method of managing product-location specific information, comprising:
   (a) collecting product-location specific information for a single geographic location from multiple users at a centralized network hub, wherein said product-location specific information includes a plurality of different expressions corresponding to the single geographic location;
   (b) associating a same location identifier to the plurality of different expressions corresponding to the single geographic location;
   (c) associating one or more attributes of the single geographic location to the plurality of different expressions associated with the same location identifier; and
   (d) distributing at least one of the plurality of different expressions along with the one or more attributes of the single geographic location.

18. One or more computer readable media encoded with a computer program for programming one or more processors to perform a method of managing product-location specific information, wherein the method comprises:
   (a) collecting product-location specific information for a single geographic location from multiple users at a centralized network hub, wherein said product-location specific information includes a plurality of different expressions for the single geographic location;
   (b) transforming said product-location specific information to generate location-harmonized data that includes a single expression for the single geographic location;
   (c) associating one or more attributes of the single geographic location to the location-harmonized data to generate location-harmonized product-location specific data; and
   (d) distributing said location-harmonized product-location specific data, or content derived therefrom to the same or different users.

19. The one or more computer readable media of claim 18, wherein the transforming comprises converting location information of the product-location specific information to latitude-longitude coordinates.

20. The one or more computer readable media of claim 18, wherein the transforming comprises geocoding.

21. The one or more computer readable media of claim 20, wherein the geocoding comprises converting location information of the product-location specific information to latitude-longitude coordinates.

22. The one or more computer readable media of claim 20, wherein the geocoding comprises providing an electronic map and determining latitude-longitude coordinates of a specific location on the map indicated by a user.

23. The one or more computer readable media of claim 18, wherein the method further comprises translating the location-harmonized product-location specific data to one or more specific customer access formats.

24. The one or more computer readable media of claim 18, wherein the method further comprises translating the location-harmonized product-location specific data to one or more specific customer access typologies or languages or both.

25. The one or more computer readable media of claim 18, wherein the method further comprises translating the location-harmonized data to one or more specific customer access formats.

26. The one or more computer readable media of claim 18, wherein the method further comprises translating the location-harmonized data to one or more specific customer access typologies or languages or both.

27. The one or more computer readable media of claim 18, wherein the one or more attributes further comprise vendor data.

28. The one or more computer readable media of claim 18, wherein the one or more attributes further comprise time data.

29. The one or more computer readable media of claim 18, wherein the distributing comprises determining that a location of an on-line user is within a geographic region that is sufficiently proximate to the single geographic location.

30. The one or more computer readable media of claim 18, wherein the method further comprises visualizing the location-harmonized information for the customer by providing a geographical map identifying locations of products.

31. The one or more computer readable media of claim 30, wherein said map comprises an interactive component that permits a customer to retrieve product, vendor, time, or other attribute, or combinations thereof, relating to a location identified on the map.

32. The one or more computer readable media of claim 31, wherein the location comprises an area on the map.

33. The one or more computer readable media of claim 18, wherein the method further comprises reporting activity relating to the handling of the product-location specific information or data generated therefrom, or combinations thereof.

34. A system of networked computing devices including a centralized network hub and multiple vendor clients each configured for communicative coupling with said hub, wherein the hub comprises said one or more computer readable media of claim 18, and wherein said product-location specific information is collected at said hub from said clients in a hub-and-spokes configuration.

35. One or more computer readable media encoded with a computer program for programming one or more processors to perform a method of managing product-location specific information, wherein the method comprises:
  (a) collecting product-location specific information for a single geographic location from multiple users at a centralized network hub, wherein said product-location specific information includes a plurality of different expressions corresponding to the single geographic location;
  (b) associating a same location identifier to the plurality of different expressions corresponding to the single geographic location;
  (c) associating one or more attributes of the single geographic location to the plurality of different expressions associated with the same location identifier; and
  (d) distributing at least one of the plurality of different expressions along with the one or more attributes of the single geographic location.

36. A method of managing information, comprising:
receiving location information at a centralized network hub for identifying a plurality of geographic locations, wherein each of the plurality of geographic locations is identified by the location information using a plurality of different expressions;
converting the received location information so that each of the plurality of geographic locations is identified by a single location expression;
for each of the geographic locations, associating one or more attributes of the geographic location to the single location expression corresponding to that geographic location;
converting one of the single location expressions into one or more of the plurality of different expressions; and
sending from the centralized network hub the converted single expression along with the one or more attributes associated with the converted single expression.

37. The method of claim 36, wherein the one or more attributes of the plurality of geographic locations are included in the location information received by the centralized network hub.

38. The method of claim 36, wherein for each of the geographic locations, the one or more attributes are included in the portions of the location information received by the centralized network hub that identify the geographic location using the plurality of different expressions.

39. The method of claim 36, wherein the one or more attributes of the plurality of geographic locations are received by the centralized network hub as additional data different from the received location information.

40. The method of claim 36, wherein for at least one of the geographic locations, the one or more attributes includes one or more business entities at the geographic location.

41. The method of claim 36, wherein for at least one of the geographic locations, the one or more attributes includes one or more products or services provided at the geographic location.

42. A system for managing information, comprising:
a centralized network hub; and
a plurality of user computing devices each configured to communicate with the centralized network hub;
wherein the centralized network hub is configured to:
  receive location information from the plurality of user computing devices for identifying a plurality of geographic locations, wherein each of the plurality of geographic locations is identified by the location information using a plurality of different expressions;
  convert the received location information so that each of the plurality of geographic locations is identified by a single location expression;
  for each of the geographic locations, associate one or more attributes of the geographic location to the single location expression corresponding to that geographic location;
  convert one of the single location expressions into one or more of the plurality of different expressions; and
  send to at least one of the plurality of user computing devices the converted single expression along with the one or more attributes associated with the converted single expression.

43. The system of claim 42, wherein the one or more attributes of the plurality of geographic locations are included in the location information received by the centralized network hub.

44. The system of claim 42, wherein the centralized network hub is further configured to receive the one or more attributes for each of the geographic locations as part of the portions of the location information that identify the geographic location using the plurality of different expressions.

45. The system of claim 42, wherein the centralized network hub is further configured to receive the one or more attributes for each of the geographic locations as additional data different from the received location information.

46. The system of claim 42, wherein for at least one of the geographic locations, the one or more attributes includes one or more business entities at the geographic location.

47. The system of claim 42, wherein for at least one of the geographic locations, the one or more attributes includes one or more products or services provided at the geographic location.

48. A method of managing information, comprising:
- receiving location information at a centralized network hub for identifying a plurality of geographic locations, wherein each of the geographic locations is identified by the location information using a plurality of different expressions;
- for each of the geographic locations, generating a single location identifier unique to the geographic location;
- for each of the geographic locations, associating the single location identifier to portions of the location information that identify that geographic location;
- for each of the geographic locations, associating one or more attributes of the geographic location to portions of the location information that were associated with the single location identifier corresponding to the geographic location; and then
- sending from the centralized network hub at least a portion of the location information along with the one or more associated attributes.

49. The method of claim 48, wherein the one or more attributes of the plurality of geographic locations are included in the location information received by the centralized network hub.

50. The method of claim 48, wherein for each of the geographic locations, the one or more attributes are included in the portions of the location information received by the centralized network hub that identify the geographic location using the plurality of different expressions.

51. The method of claim 48, wherein the one or more attributes of the plurality of geographic locations are received by the centralized network hub as additional data different from the received location information.

52. The method of claim 48, wherein for at least one of the geographic locations, the one or more attributes includes one or more business entities at the geographic location.

53. The method of claim 48, wherein for at least one of the geographic locations, the one or more attributes includes one or more products or services provided at the geographic location.

54. A system for managing information, comprising:
- a centralized network hub; and
- a plurality of user computing devices each configured to communicate with the centralized network hub;

wherein the centralized network hub is configured to:
- receive location information from the plurality of user computing devices for identifying a plurality of geographic locations, wherein each of the geographic locations is identified by the location information using a plurality of different expressions;
- for each of the geographic locations, generate a single location identifier unique to the geographic location;
- for each of the geographic locations, associate the single location identifier to portions of the location information that identify that geographic location;
- for each of the geographic locations, associate one or more attributes of the geographic location to portions of the location information that were associated with the single location identifier corresponding to the geographic location; and then
- send to at least one of the plurality of user computing devices at least a portion of the location information along with the one or more associated attributes.

55. The system of claim 54, wherein the one or more attributes of the plurality of geographic locations are included in the location information received by the centralized network hub.

56. The system of claim 54, wherein the centralized network hub is further configured to receive the one or more attributes for each of the geographic locations as part of the portions of the location information that identify the geographic location using the plurality of different expressions.

57. The system of claim 54, wherein the centralized network hub is further configured to receive the one or more attributes for each of the geographic locations as additional data different from the received location information.

58. The system of claim 54, wherein for at least one of the geographic locations, the one or more attributes includes one or more business entities at the geographic location.

59. The system of claim 54, wherein for at least one of the geographic locations, the one or more attributes includes one or more products or services provided at the geographic location.

* * * * *